Aug. 6, 1929.   M. J. HUGGINS   1,723,173

MEANS FOR MEASURING THE QUANTITY OF LIQUID IN TANKS

Filed June 23, 1923

Inventor
Merion J. Huggins
By his Attorney

Patented Aug. 6, 1929.

1,723,173

UNITED STATES PATENT OFFICE.

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE.

MEANS FOR MEASURING THE QUANTITY OF LIQUID IN TANKS.

Application filed June 23, 1923. Serial No. 647,208.

This invention relates to means to indicate the quantity of liquid in a tank, and is primarily adapted for observing or reading from an indicating device on the instrument board of a motor vehicle the quantity of gasolene in a storage tank usually at the rear of the vehicle, either by measure or by the position of the liquid in the tank, and it is the object of the invention to provide an improved simple and inexpensive, efficient, reliable and accurate mechanical means and mechanism for this purpose.

A further object of the invention is to provide in connection with means for indicating the quantity of liquid in a tank located at a point remote from that at which the indicating means is located and observed; means to indicate and totalize the successive fillings or quantity of liquid deposited in the tank.

Figure 1:
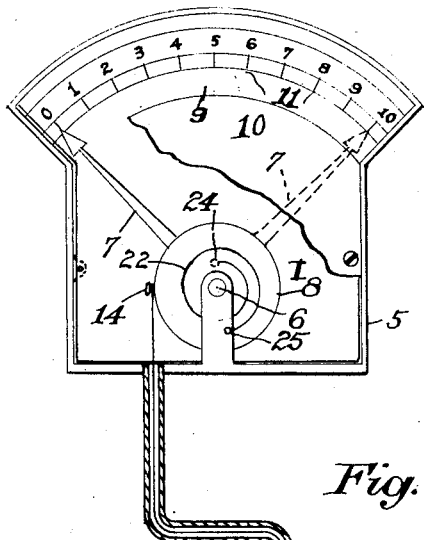

In the drawing accompanying and forming a part of this specification, Figure 1 is a diagrammatic illustration of an installation of the invention with the indicating means partly broken away to illustrate the index and its actuating means and showing a liquid storage tank in section with the combined weight and float to control the actuation of the indicating means.

Figure 2:
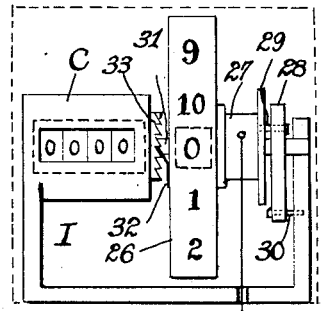
Figure 3:
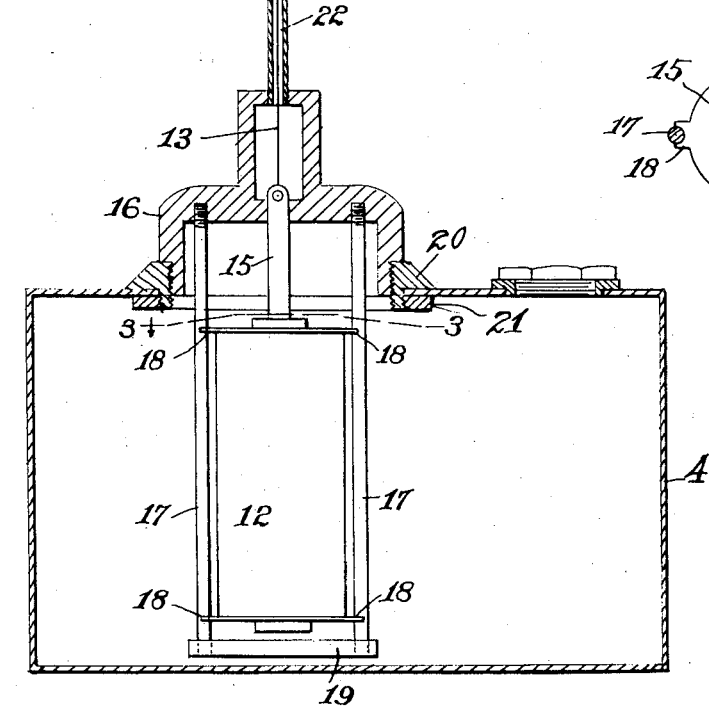

Figure 2 is a front elevation of a modified construction and arrangement of the indicating means and showing in connection therewith means to totalize and indicate the total quantity of successive fillings or deposits of liquid in the tank; and Figure 3 is a cross sectional view taken on the line 3—3 of Figure 1 to show the mounting of the float.

In carrying out the embodiment of the invention shown in Figure 1 of the drawing a tank 4 containing the liquid to be measured is located at a point distant or remote to the indicating device (designated in a general way by I) from which the quantity of liquid in the tank is to be read or observed. As stated the invention is particularly adapted for use to indicate the quantity of gasolene in the gasolene storage tank of a motor vehicle, usually located at the rear of the vehicle, and the indicating device located on the instrument board of the vehicle in position to be readily viewed by the driver of the vehicle.

The indicating device comprises a suitable casing 5 in which is pivotally or rotatably mounted, as at 6, an index or pointer 7 radiating or extending laterally from a circular portion 8, the end of the pointer being arranged in the form of an arrow to be observed through an arcuately arranged slot 9 in a dial 10 secured in the front of the casing 5. The dial is arranged with a scale calibrated to indicate the quantity of liquid in the tank either by measure of by the position of the liquid level in the tank, the dial in the present instance being calibrated to indicate by measure in gallons, and is arranged with the numeral indices zero to 10 and adapted to measure the liquid in a tank having a capacity of ten gallons, said indices being located above graduations 11 on the dial and the slot 9.

The index or pointer 7 is mechanically actuated to move the pointer in a direction toward and maintain the same in zero position with no liquid in the tank by a weight element 12 suspended in the tank from the pointer whereby the latter is moved in one direction by the load of the weight. The weight is suspended from a circular portion from which the index extends by suitable means, such as a flexible cable 13, secured at one end to the index, as at 14, and extending through a sheath, such as a tube 22, with the opposite end secured to a rod 15 carrying the weight element. The weight is suspended in the tank in line with an opening therein with the weight carrying rod 15 slidably engaging in an opening centrally of a cupped or recessed closure cap 16 for said opening, the recessed portion of the cap being of greater cross sectional dimension that the weight element to permit of movement of said element up into the cap. The weight is guided in its up and down movement by rods 17 secured at one end in the closure to extend down into the tank at diametrically opposite sides of the weight element with bifurcated ears 18 projecting laterally from the upper and lower ends thereof engaging said guide rods. To add rigidity to the rods they may be connected at the lower end by a cross member 19. By this arrangement the weight is removable from the tank as a unit with the closure 16 and the weight is held in the tank and prevented from having violent movement imparted thereto due to the sloshing of the liquid in the tank. To readily apply the device to gasolene tanks of motor vehicles now in commercial use to be substituted for the usual indicator mounted in an opening in such tanks, the cup has threaded connection with a flanged collar 20 clamped onto the edges of said opening by a clamping collar 21 in the interior of the tank having threaded connection with said collar 20, as clearly shown in Figure 1.

The weight element 12 is constructed and arranged whereby the force of the load of the weight on the index to move the same is proportional to the force of the buoyancy of the liquid in the tank and displacement thereof by the weight whereby to decrease and increase or vary the load of the weight upon the index to actuate the latter. This may be accomplished in various ways as by proportioning the length of the weight to the depth of the tank. In some cases the length of the weight may be equal to or greater than the depth of the tank, while in other cases, as illustrated, the weight may be of a size less than the depth of the tank, depending upon the character and degree of fineness of calibration of the scale reading. The construction and arrangement of the weight element is such that when there is no liquid in the tank the full load of the weight will exert a force on the index to move and maintain the latter in zero position as indicated in the drawing, and as the liquid level in the tank rises to the point where the weight is practically submerged in the liquid in the tank, which will be when the tank is filled to its capacity, it will just float and relieve the index of its entire load. In this position of the weight the index 7 will be in position to coincide with the numeral 10 of the scale, as shown in dotted lines. To cause the index to move to this position means are provided to exert a force upon the index to move it in a direction reverse to that in which it is moved by the weight element, which force is proportional with the relief of the load of the weight upon the index and operates to move the index to position of equilibrium or poise between the forces of the weight of the float and said counterbalancing means and registering the variations in the pull or load of the weight, such variations being proportional to the load of the weight and the quantity and displacement of the liquid in the tank by the weight thus operating to control the movement of the index to indicate the quantity of liquid in the tank. This means is shown as consisting of a spring 22 coiled about the pivot support of the index with one end anchored to the disk or head portion 8 of the index, as at 24, and the other end anchored to a fixed part of the casing, as at 25. The quantity indications are procured by variations in the load of the weight upon the index and the force thereof exerted against the force exerted by the spring affected by the variations of the quantity of the liquid in the tank and the variations in the displacement of the liquid in the tank by the float with the resultant buoyancy or upward pressure of the liquid on the weight increasing and decreasing the load thereof on the index.

In the modification shown in Figure 2 the index is in the form of a circular and rotatably supported dial 26 arranged with calibrations on the periphery thereof to indicate the quantity to be measured and arranged with indices zero to 10 representative of ten gallons. The weight carrying cable 13 is connected at one end to a drum 27 projecting from and integral with the index and which may constitute the hub of said index, the index being rotated by and in accordance with the variations in the quantity of liquid in the tank through the action of the weight element 12 as hereinbefore set forth, and the index being moved or rotated to and maintained in position of poise or equilibrium by a counterpoise or counterbalancing means, shown as comprising a spring 28 having one end anchored, as at 29, to the drum 27 and the other end anchored to a fixed part, as at 30, and operating in a manner similar to the spring 22 in Figure 1.

To totalize and indicate the quantity of successive fillings or deposits of liquid in the tank, a counter, designated in a general way by C, is actuated from the index as the latter is actuated by the float when liquid is deposited into the tank. In the present instance there is shown such a means in connection with the arrangement illustrated in Figure 2 wherein one end of the supporting shaft 31 of the index 26 is loosely journalled in the end of the shaft of the primary mover or digit wheel of the counter. In the zero position of the index shown in Figure 2 with no liquid in the tank, as liquid is deposited in the tank and the index is rotated through the action of the weight element and its counterpoise means and yielding pawl 32 carried at the side of the index will engage a tooth of a ratchet wheel 33, shown in the present instance in the form of a toothed crown wheel, movable with the primary mover or digit wheel of the counter moving the latter therewith and thereby actuating the counter, this movement of the counter being proportional with the movement of the index wheel and the quantity of the tank filling. As the index moves in reverse direction due to a discharge of liquid from the tank and a consequent increase of the load of the float on the index the pawl 32 will ride over the teeth of the ratchet wheel 33 and impart no movement thereto.

The mechanism illustrated in Figure 2 is mounted in a casing having a faceplate, as indicated in dotted lines, arranged with a pair of openings of windows axially of the counter and index through which to observe the graduations on the index and the digit wheels of the counter, and thereby indicate the quantity of the liquid in the tank and the total of the successive fillings or deposits of liquid into the tank.

While I have illustrated and described means to totalize and indicate the total quantity of successive fillings or deposits of liquid in the tank in connection with a structure as illustrated in Figure 2, it will be obvious that the totalizing means may be utilized in connection with the arrangement shown in Figure 1 to be operated through the movement of the index pointer 7.

Having thus described my invention I claim:

1. In a device for indicating the quantity of liquid in a tank and the total quantity of successive additions of liquid to the tank, a rotatably supported drum having calibrations upon the periphery thereof to indicate quantity in the desired terms, means connected to said drum operative through variations in the quantity of liquid in a tank to rotate and control the rotation of the drum to indicate the quantity of liquid in the tank, and means arranged in axial alinement with and rotative from the drum when moved in one direction to totalize the units of movement of the drum in such direction for the purpose specified.

2. A device for indicating the quantity of liquid in a tank and to totalize the successive fillings of the tank as claimed in claim 1, wherein the means to totalize the successive fillings of the tank comprises a counter, and means operative to connect and impart the movement of the drum to the counter when the movement of the drum is effected by an increase of liquid in the tank and to disconnect the drum from the counter when the movement of the drum is effected by a decrease of the liquid in the tank.

3. In a device for indicating the quantity of liquid in a tank, a rotatably supported indicator drum provided with calibrations on the periphery thereof to indicate the quantity of liquid in the desired terms; a weight element; means to suspend the weight element in the tank from the indicator drum, said means being connected to the periphery of the drum and operative to exert a force upon the indicator drum to rotate the same, the weight of said element being greater than the bouyant effect of the liquid thereon except when the element is nearly submerged, the buoyancy of the liquid diminishing with the fall of the level thereof below said point; and means to exert a force upon and move the indicator drum in a direction reverse to that in which it is moved by the weight, which movement is varied in accordance with the relief of the load of the weight upon the indicator drum to actuate the indicator drum and indicate the quantity of liquid in the tank.

4. In a device for indicating the quantity of liquid in a tank, a rotatably supported indicator drum provided with calibrations on the periphery thereof to indicate the quantity of liquid in the desired terms; a weight element; means to suspend the weight element in the tank from the indicator drum, said means being connected to the periphery of the drum and operative to exert a force upon the indicator drum to rotate the same the load of the weight element upon the indicator drum being increased and decreased by and in accordance with the change in the buoyant effect of the liquid on said element due to the variations in the quantity of liquid in the tank; and a spring to move the indicator drum in a direction reverse to that in which it is moved by the weight element, this movement of the indicator drum by the spring being proportional with the relief of the weight of said element upon the indicator drum to actuate the indicator drum and indicate the quantity of liquid in the tank.

Signed at New York city, in the county of New York and State of New York, this 21st day of June, 1923.

MERION J. HUGGINS.